United States Patent [19]

Gerber et al.

[11] Patent Number: 5,646,987
[45] Date of Patent: Jul. 8, 1997

[54] DYNAMIC REALLOCATION OF CALLS TO AGENT GROUPS

[75] Inventors: Eugene Gerber, Bolingbrook; Francis Joseph Pope, III, Naperville; Joseph John Wiktor, Schaumburg, all of Ill.

[73] Assignee: Lucent Technologies Inc., Murray Hill, N.J.

[21] Appl. No.: 361,629

[22] Filed: Dec. 22, 1994

[51] Int. Cl.$^6$ ................................................ H04M 3/54
[52] U.S. Cl. ................................................ 379/265; 379/45
[58] Field of Search ................................ 379/265, 266, 379/309, 218, 45, 220, 221, 210, 211, 212, 127, 142, 40, 43, 214

[56] References Cited

U.S. PATENT DOCUMENTS

| | | | |
|---|---|---|---|
| 4,737,983 | 4/1988 | Frauenthal | 379/265 |
| 4,757,267 | 7/1988 | Riskin | 379/201 |
| 4,893,325 | 1/1990 | Pankonen | 379/265 |
| 4,951,310 | 8/1990 | Honda | 379/266 |
| 5,161,180 | 11/1992 | Chavous | 379/127 |
| 5,249,223 | 9/1993 | Vanacore | 379/266 |
| 5,291,552 | 3/1994 | Kerrigan | 379/220 |
| 5,347,574 | 9/1994 | Morganstein | 379/142 |
| 5,408,528 | 4/1995 | Carlson | 379/142 |

OTHER PUBLICATIONS

Technical Document AT&T 475–550–120, Pinnacle(R) Automatic Call Distributor, Call Vectoring Guide, 5E6 to 5E9 Software Releases, Issue 2.00, Nov. 1993, pp. 1–1–6–3, Table of Contents, Glossary & Index Primary Examiner—Dwayne Bost
Assistant Examiner—Thomas F. Presson
Attorney, Agent, or Firm—Dennis J. Williamson; Werner Ulrich

[57] ABSTRACT

An arrangement for selectively altering the serving of emergency serving areas ESAs. Normally emergency serving areas are grouped and all calls for a group are handled by teams of agents at public safety answering point (PSAP) positions. For special emergencies such as a fire it is deskable that all traffic from one emergency service area be specially routed either to a single destination such as one PSAP position or a telephone in a fire station or to a special group of agents. This is accomplished by assigning a different routing telephone number to the emergency service number ESN corresponding to each emergency service area and using that routing telephone number ESN for routing calls. The calls are routed first to a single agent position which is normally not logged in and then on a default basis to an automatic call distributor (ACD) number for routing to a team of PSAP agents. If a special emergency occurs in one of the ESAs, then the routing for the corresponding ESN is changed either by logging on an agent to handle all calls for that ESN or by changing the default ACD number to route these calls to a different ACD or to a different telephone. Advantageously, such an arrangement allows for a highly flexible routing under special emergency conditions without requiring a complex individual ACD routing for each ESN under normal conditions.

9 Claims, 4 Drawing Sheets

DYNAMIC REALLOCATION OF CALLS TO AGENT GROUPS

TECHNICAL FIELD

This invention relates to arrangements for reallocating calls to agents and groups of agents of an automatic call distributor (ACD).

Problem

Emergency calls are usually made by calling a single number, 911. Modern emergency service has been substantially enhanced over the past decades and is now referred to as Enhanced 911 or E911. Such calls are then routed to an emergency service bureau which is provided with the telephone number of the caller so that the caller's address can be found in order to dispatch police, fire, or medical help from an organization serving that address.

Addresses are grouped for the purposes of such emergency service into emergency service areas (ESAs) each of which has the corresponding emergency service number (ESN). All callers having the same emergency number are served by a common set of emergency servers in the service bureau.

The emergency service bureau comprises a group of attended Public Safety Answering Point (PSAP) emergency service positions for serving emergency calls. An automatic call distributor (ACD) in the switching system serving the emergency service bureau queues and distributes calls to the PSAP positions of the bureau. As with other automatic call distributors (ACDs), the different PSAP positions are flexibly arrangeable into a plurality of teams each team for serving some specifiable portion of incoming telephone traffic. In this case of an emergency service bureau, the teams are assigned to serve particular groups of emergency service numbers. A data base determines the emergency service number (ESN) for an incoming call, for use by the ACD to select the team or teams for handling the call. Calls for a plurality of ESNs are routed in a common fashion to a common set of PSAP teams, since the number of ESNs far exceeds the number of teams or PSAPs.

A problem arises in the prior art if an emergency observable by many callers, such as a fire, occurs in one of the emergency service areas. Traffic from that emergency service area, as well as the other emergency service areas grouped for routing in a common fashion, continues to be fed to all members of the team serving the group of ESNs. All such calls are routed as if to a common ACD telephone number. Thus, the calls for the common emergency are distributed among all members of that team and other emergency calls from other emergency service areas continue to be sent to that team even though that team is already being flooded by calls for the common emergency. The obvious solution of assigning a different ACD telephone number to each emergency service area is very difficult and expensive to implement because of equipment limitations in the switching systems that commonly serve the emergency bureaus and because of the large amount of memory required for each ACD telephone number.

A problem of the prior art, therefore, is that there is no satisfactory way of isolating calls to a particular emergency service area dynamically in response to recognition of a special emergency.

Solution

The problem of the prior art is solved and an advance is made over the prior art in accordance with the principles of applicants' invention by arranging for a system which allows special treatment for calls from a limited number of emergency service areas by assigning to each ESN a different telephone number and routing calls for most ESNs to the regular ACD telephone number for an ESN group, but routing a few ESNs to a specific agent or agent team selected by the telephone number of the ESN. The calls from the special ESAs are then routed via the telephone number of the ESN, to a specific agent logged on for the special ESA, or to a special team of agents, which team may illustratively be defined by the supervisor at the time that the emergency service area whose calls are to be specially treated is entered by the supervisor into the data tables used for controlling the ACD. Advantageously, all calls from the emergency service area having the common emergency will then be routed to one or more pre-selected PSAP positions and the agent attending that position.

The arrangement is not limited to emergency service. More generally, a service area (SA) and service number (SN) may be associated with individual or groups of ANI numbers, and the routing in accordance with the principles of this invention may be practiced.

DETAILED DESCRIPTION

Figure 1:
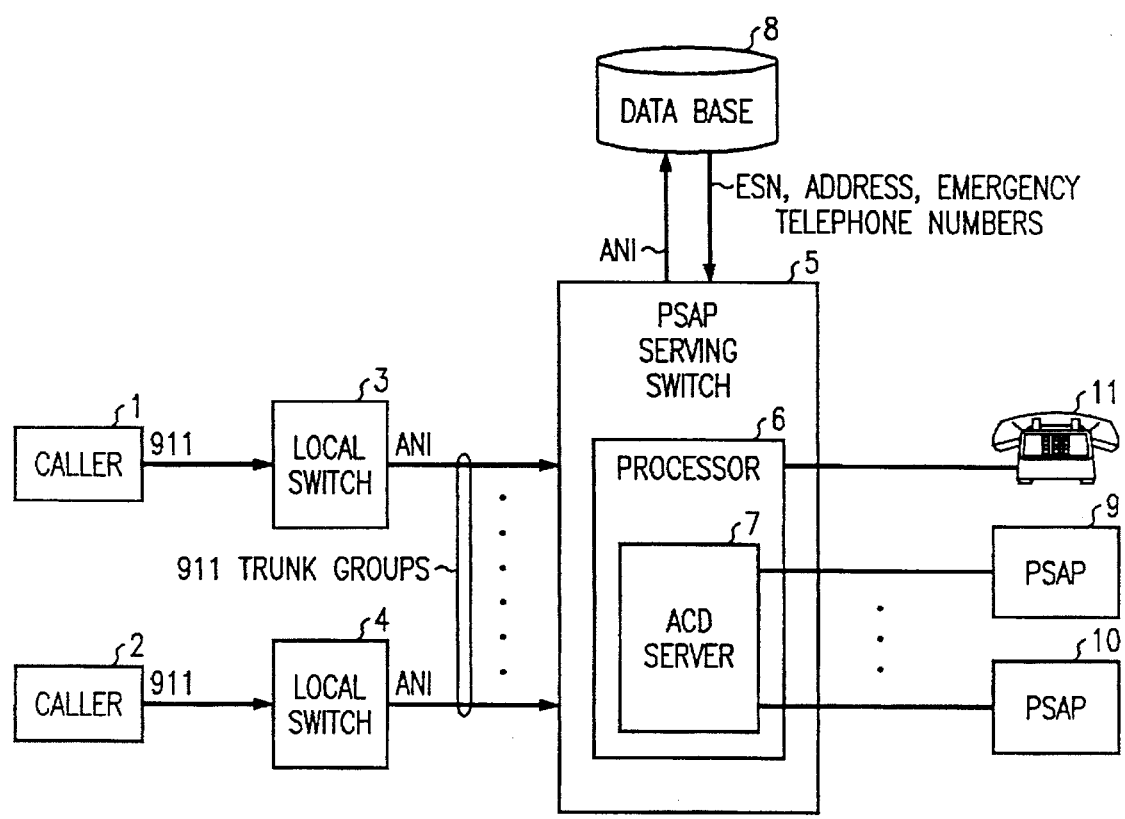
FIG. 1 is a block diagram illustrating the operation of applicants' invention.

FIG. 1 is a block diagram illustrating the operation of applicants' invention. Different callers 1, . . . , 2 dial 911 to reach emergency service. They are switched through their corresponding local switches 3, . . . , 4 each of which continues the process of setting up the call by connecting the call to an emergency service trunk group and forwarding the number of the caller as identified by automatic number identification (ANI) to a switching system 5 for serving the emergency bureau. Switching system 5 includes a processor 6 which includes programs and data tables for serving the automatic call distributor 7 for accessing the different agent positions 9, . . . , 10 for serving emergency calls. Switching system 5 also serves regular telephones 11. Switching system 5 upon receipt of a call from the 911 trunk group sends to data base 8 a message including the number of the caller as identified by automatic number identification. The data base returns to the switch address information for the caller, the emergency service number (ESN) for that caller, and telephone numbers for emergency services in that ESA.

Figure 2:
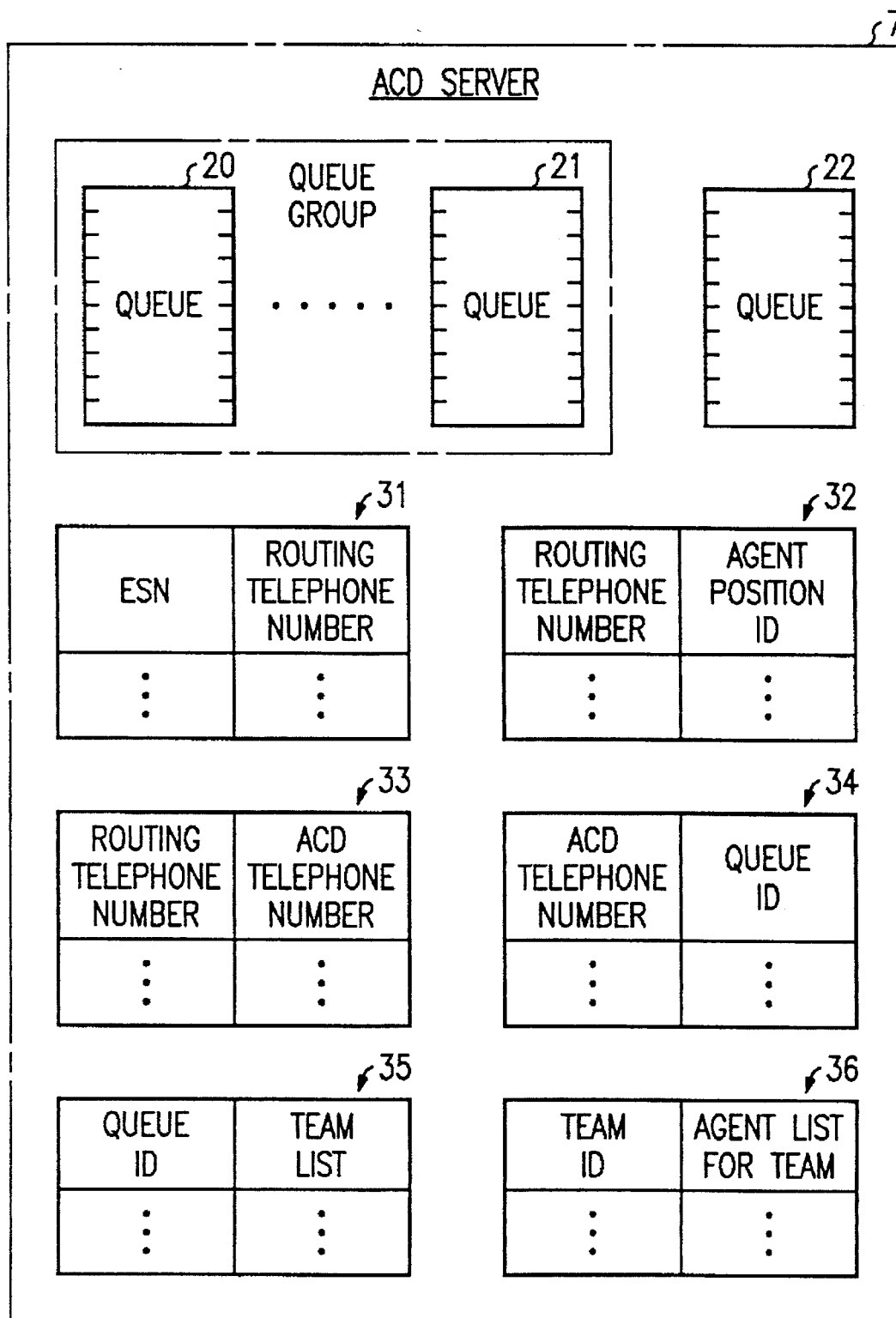
FIG. 2 is a block diagram showing the memory blocks used by an ACD server.

Referring to FIG. 2, the ACD data includes a number of tables and a group of queues 20, . . . , 21 for queuing different sets of emergency calls, the queue being selected on the basis of the emergency service routing number. Table 31 specifies a routing telephone number for each ESN. As is well known to those of ordinary skill in the art, a telephone number is the key to a large number of routing and alternate routing arrangements for completing calls. Table 32 translates between the routing telephone number and the identity of a logged in agent position; this entry is null unless an agent position has been assigned to handle all calls from the emergency service area of that routing telephone number. Table 33 translates between the routing telephone number and the routing telephone number for use if that agent position is not logged in (the normal situation) and is usually an ACD telephone number. The ACD telephone number is used, in the normal case when calls from an ESA are processed by the team(s) serving the ESA group, or, in the emergency case when a team has been assigned to process calls from the ESA of that routing telephone number. Table 34 specifies which queue(s) should be used for handling calls for a particular ACD number. Table 34 translates between the ACD number and the particular queue(s) in which calls for that emergency telephone number are to be entered. Table 35 identifies which team(s) of agents should process calls in a particular queue and Table 36 identifies which agent positions are part of each team. If the call can be served immediately, i.e., if the particular queue for that call is empty, actions are taken as if the call had been previously entered in the queue so that the same selection process of team and agent is followed whether or not calls are queued.

Suppose that one of the agents receives one or more calls and realizes from the call that a whole group of calls is likely to come all of which deal with the same common emergency situation such as a fire. This agent then contacts the supervisor and the supervisor arranges that calls for that emergency service area are to be treated differently. (The agent may also be able to act directly as a supervisor.) The supervisor selects an agent and causes that agent to log on in such a way that calls from that ESA are routed to that agent. This is accomplished by entering that agent's identity into Table 32 at a position corresponding to the routing telephone number for that ESN. Alternatively, the supervisor can change the entry in Table 33 for that ESN, to cause traffic to the selected ESA to be routed as if the call were directed to an ACD telephone number with prespecified (or specifiable) routing. The queue(s) for one(s) of these special ACD emergency service numbers may be pre-assigned such as queue 22.

If it is discovered that calls for two adjacent ESAs are involved in the common emergency, then the entries for both of these ESAs in Tables 32 and 33 are set up so that either of the two ESNs lead to the same special routing treatment.

This arrangement allows for the solution of the prior art problem without requiring any increase in the number of ACD telephone numbers, queues, or teams to be used in the emergency service bureau and can probably be used to reduce the number of such parameters in a typical situation because it is known how to isolate calls from particular ESNs. Techniques for updating control tables for ACDs are well-known, reliable, and are designed to allow for rapid changes in response to dynamic traffic conditions.

Figure 3:
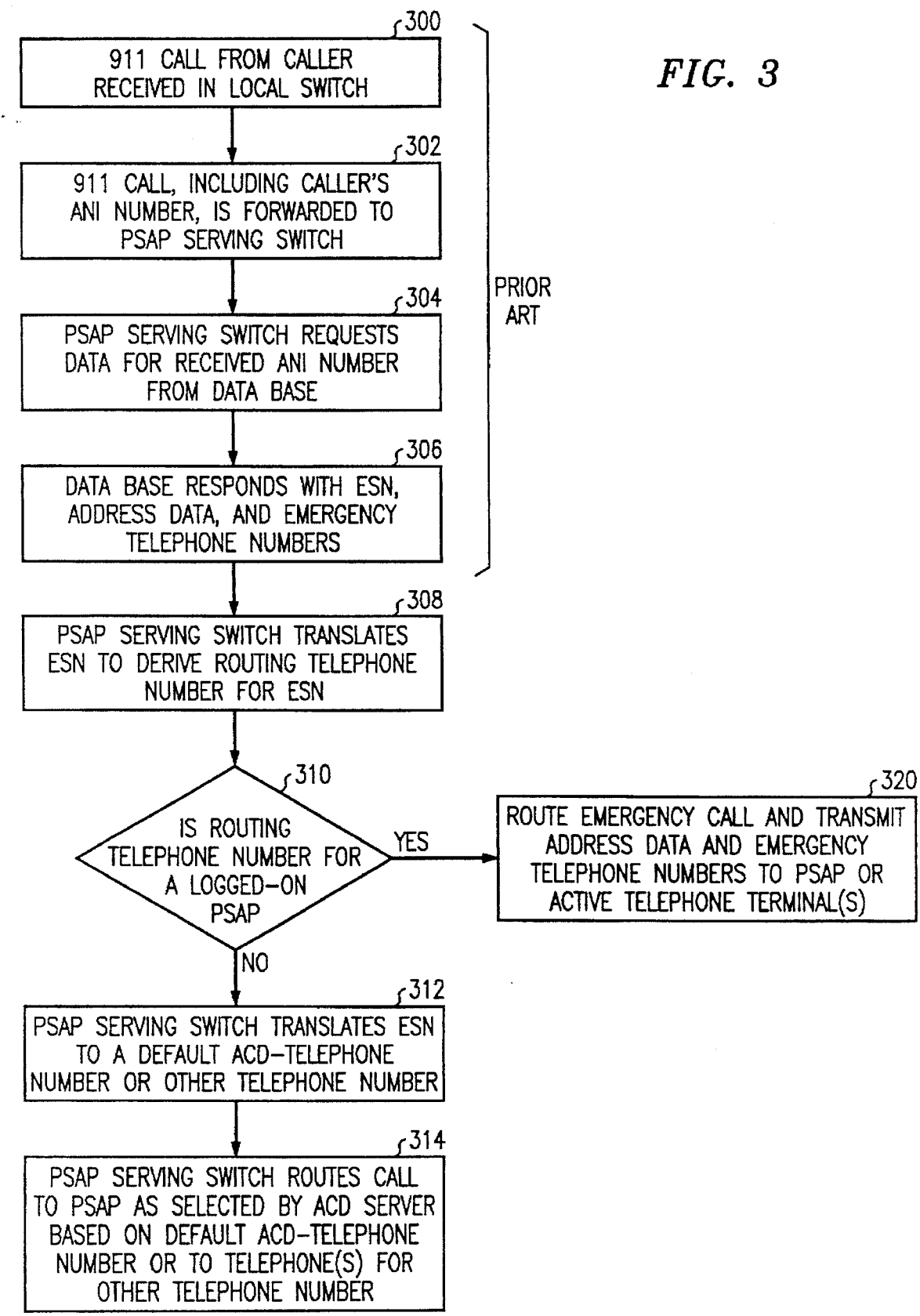
FIGS. 3 and 4 are flow diagrams illustrating the method of operation of applicants' invention.

FIG. 3 is a flow diagram illustrating the operations required to serve a 911 emergency call. The call is originally received from a caller in a local switch (action block 300). The call, including the caller's telephone number as identified by automatic number identification (ANI), is forwarded to the switch for serving PSAP positions (action block 302). The PSAP serving switch requests data for the received ANI from the data base (action block 304). The data base responds with an emergency service number (ESN) based on the ANI. The ESN defines an emergency service area (ESA) for the caller. The data base also supplies address data and emergency telephone numbers (fire, police, etc.) for serving the caller (action block 306).

Action blocks 300–306 are from the prior art. The rest of the blocks of FIG. 3 refer to the subject matter of applicant's invention. The PSAP serving switch translates the ESN to derive a routing telephone number for that ESN (action block 308). A different (unique) routing telephone number is provided for each ESN in order to maximize the flexibility of this arrangement. (Advantageously, this arrangement allows for an easy identification of the ESN, when the telephone number appears on the screen of a PSAP position.) Decision block 310 decides whether the routing telephone number is for a logged on PSAP or for any other active telephone terminal(s). If not, and this is the normal treatment for emergency calls, the PSAP serving switch translates the ESN or the unique telephone routing number to a default ACD telephone number or other routing telephone number (action block 312). The PSAP serving switch then routes calls to a PSAP as selected by the ACD server based on that default ACD telephone number (action block 314).

If the routing telephone number is for a logged on PSAP or other active telephone terminal(s), then the emergency call is muted to the PSAP or active telephone terminal(s) specified by the routing telephone number for the ESN (action block 320). This implements a primary purpose of applicant's invention, namely, the routing of emergency telephone traffic for a selected emergency area to a specific PSAP. The agent at that PSAP can then gather all information related to the fire or other emergency and can arrange to dispatch appropriate help. Effectively, the routing system of the prior art jumps directly from action block 306 to action block 312 except that the default ACD telephone number is simply the ACD telephone number specified for the identified ESN and for all other ESNs in the group that is served in common. Advantageously, applicant's arrangement of having a unique routing telephone number for each ESN permits a highly flexible routing scheme to be implemented, the scheme capable of being easily changed dynamically, and without requiting a large number of ACD telephone numbers. Each ACD number adds considerable expense because it has the capability for routing separately according to special complex rules for routing for ACDs.

Note that block 320 may route a call either to a PSAP or to other active telephone(s). For some types of emergency situations it may be desirable to route the calls to a different type of destination such as a fire department station or to route it to a group of telephones sharing a directory number. If the call is routed to such a group then the first telephone in the group which answers receives the call.

Figure 4:
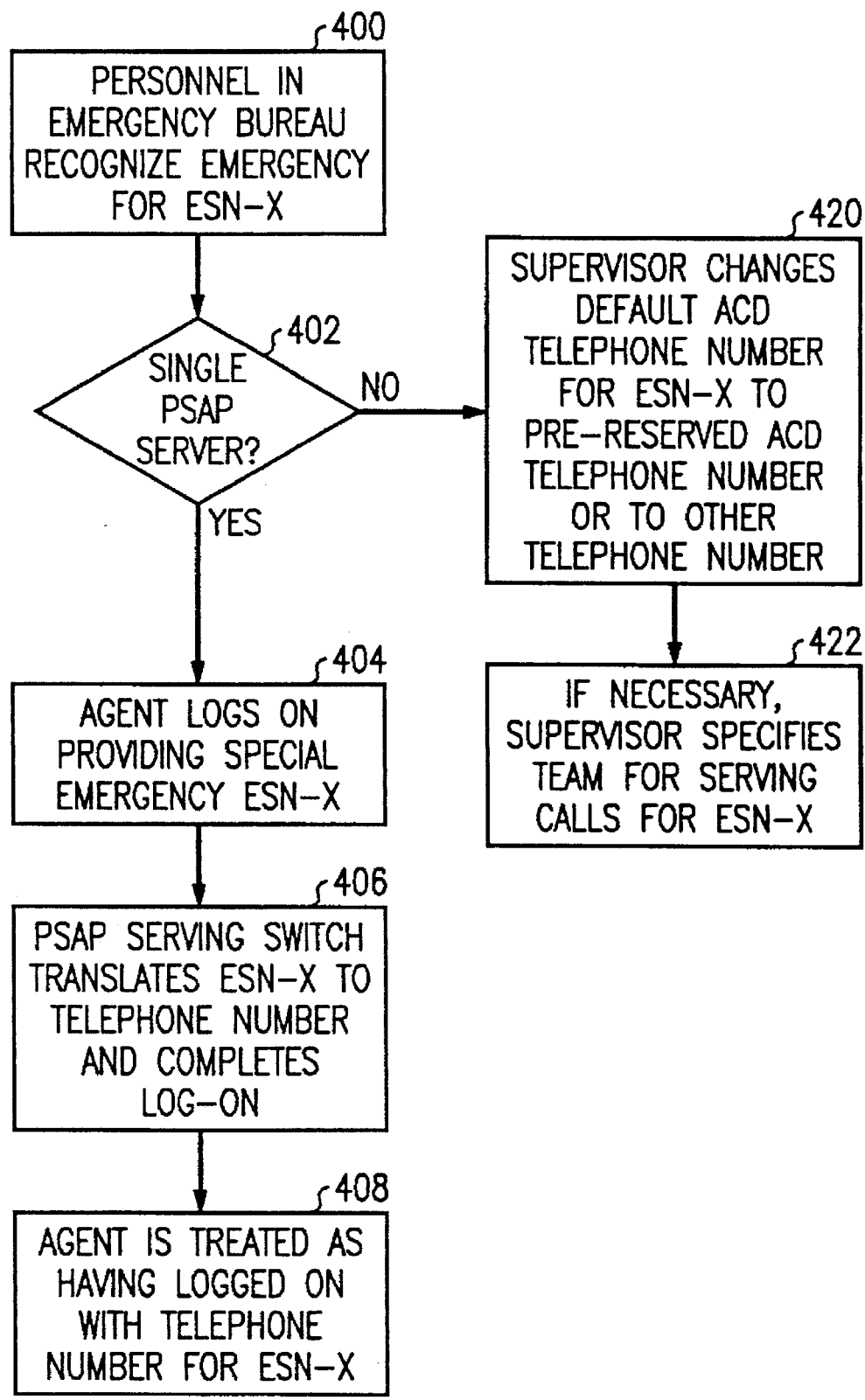

FIG. 4 illustrates the actions performed in an emergency bureau in order to provide for specialized routing of calls from one of the ESAs. Action block 400 indicates that the personnel in the emergency bureau recognize an emergency for ESN-X. This is likely to be the result of one or several agents' realization that more calls are likely to be encountered for a particular situation being reported. Test 402 indicates that a decision is made whether or not a single PSAP server should serve calls for ESN-X. If the decision (which may be made by the Supervisor or by some Acting Supervisor) is made that this is appropriate, then a selected agent logs onto the system providing in the log on message the identification of the special emergency ESN. In this case ESN-X (action block 404). The PSAP serving switch translates the ESN to the unique routing telephone number for that ESN, and completes the log on for the PSAP for that telephone number (action block 409); thereafter, the agent is treated as having logged on with the telephone number for ESN-X (action block 408). Subsequent calls from ESA-X will be routed via action block 320 of FIG. 3 and will therefore be routed directly to that PSAP.

If the calls from ESA-X are not to be sent to the single PSAP position, the supervisor changes the default routing telephone number (usually an ACD telephone number for ESN-X) to a pre-reserved ACD telephone number, if calls are to be served by PSAP positions, or to some other telephone number if an alternate destination is desired (action block 420). The other telephone number can then be the key to routing the call further through call forwarding, alternate destination in case of overflow of queues, and any other routing arrangement implemented in the PSAP serving switch and its ACD processes. If necessary, the supervisor specifies the team or teams for serving calls for ESN-X, i.e., the team or teams selected by the pre-reserved ACD telephone number (action block 422).

The tables 31–36 have been shown as tables in order to simplify the understanding of the process of applicant's invention. The effective equivalent to having such tables can be achieved in other ways well know to designers of ACDs. For example, call vectoring arrangements are actually used in one preferred embodiment to specify default routes and the states that cause these routes to be used; alternatively default ACD numbers may be directly associated with the ESN telephone numbers instead of being listed in a separate table.

Modern emergency serving systems frequently supply several routing telephone numbers for each ESN in order to allow for back-up service of emergency calls if there is a temporary overload from one or a group of ESNs.

For some conditions (low traffic, for example), the default routing telephone of one ESN may be changed to the basic routing telephone number of another ESN. This is just another example of the flexibility of applicants' arrangement.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method of routing telephone calls from a switching system to agent positions, comprising the steps of:
   receiving a call from a caller at the switching system including an automatic number identification (ANI) number associated with said caller;
   providing said switching system with a service number based on said ANI number and determining a routing number for said service number;
   determining if said routing number requires normal routing or special routing;
   if the routing number requires normal routing, translating said service number to a default telephone number and routing the call using said default telephone number;
   if the routing number requires special routing, routing said call to a predetermined agent position based on specified routing data, said specified data being obtained by logging in said predetermined agent position and translating the routing number into an identification of the predetermined agent position; and
   altering said routing data based upon expected calling conditions.

2. The method of claim 1 wherein said default routing number is an ACD (Automatic Call Distributor) number for routing calls to specifiable agent positions.

3. The method of claim 1 wherein said default routing number is a telephone number of a single destination.

4. The method of claim 1 wherein said default routing number is a number of a shared call appearance for a plurality of telephone stations.

5. The method of claim 1, wherein the step of altering said routing data includes the step of logging in another agent position.

6. The method of claim 1, wherein the step of determining if the routing number requires normal routing or special routing includes the step of determining whether a particular situation that is the subject of the call is likely to be one for which a plurality of calls will be received.

7. A method of routing telephone calls from a switching system to agent positions, comprising the steps of:
   receiving a call from a caller at the switching system including an automatic number identification (ANI) number associated with said caller;
   providing said switching system with a service number based on said ANI number and determining a routing number for said service number;
   determining if said routing number requires normal routing or special routing;
   if the routing number requires normal routing, translating said service number to a default telephone number and routing the call using said default telephone number;
   if the routing number requires special routing, routing said call to a predetermined agent position based on specified routing data, said specified data being obtained by translating the routing number into an automatic call distribution (ACD) number where the ACD number routes the call to the predetermined agent position; and altering said routing data based upon expected calling conditions.

8. The method of claim 7, wherein the step of altering said routing data includes the step of translating said routing number to another ACD number having a prespecified routing.

9. The method of claim 7, wherein the step of determining if the routing number requires normal routing or special routing includes the step of determining whether a particular situation that is the subject of the call is likely to be one for which a plurality of calls will be received.

* * * * *